United States Patent [19]
Schmuck

[11] 3,919,573
[45] Nov. 11, 1975

[54] ELECTRICAL CONTACT ARRANGEMENT FOR DISENGAGEABLE PARTS OF AN ELECTRIC TOOL

[75] Inventor: Peter Schmuck, Mauren, Liechtenstein

[73] Assignee: Hilti Aktiengesellschaft, Liechtenstein

[22] Filed: June 26, 1974

[21] Appl. No.: 483,294

Related U.S. Application Data

[63] Continuation-in-part of Ser. No. 298,411, Oct. 17, 1972, abandoned.

[30] Foreign Application Priority Data

Nov. 9, 1971  Germany............................ 2155686

[52] U.S. Cl. ...................... 310/50; 310/71; 339/92
[51] Int. Cl.² ......................................... H02K 7/14
[58] Field of Search ............. 310/47, 50, 42, 71, 68, 310/66, 89, 91; 320/2; 318/1, 7; 173/170; 322/1; 339/92, 92 M; 315/33

[56] References Cited
UNITED STATES PATENTS

| | | | |
|---|---|---|---|
| 2,512,407 | 6/1950 | Wood............................ | 310/71 UX |
| 3,109,949 | 11/1963 | Hartwig .............................. | 310/68 |
| 3,206,714 | 9/1965 | Kostich ............................ | 339/92 M |
| 3,432,703 | 3/1969 | Sheps................................... | 310/50 |
| 3,440,594 | 4/1969 | Hopp .................................. | 310/71 |
| 3,477,001 | 11/1969 | Spinard................................ | 310/71 |
| 3,533,119 | 10/1970 | Dokos................................... | 320/2 |
| 3,604,960 | 10/1972 | Krestel................................. | 310/50 |
| 3,631,275 | 12/1971 | Conrad................................. | 310/51 |

FOREIGN PATENTS OR APPLICATIONS

1,142,949  1/1963  Germany ............................ 310/71

*Primary Examiner*—R. Skudy
*Attorney, Agent, or Firm*—Toren, McGeady and Stanger

[57] ABSTRACT

In an electric tool formed of a tool housing and a handle detachably connected to the housing, a portion of the electrical system for operating the tool is located in the housing and the remaining portion including the switch is located in the handle. Electrical contacts are arranged in the handle and in the tool housing so that they engage automatically when the handle is assembled on the tool housing and they disconnect automatically when the handle is removed from the tool housing. Similar automatic disconnection can be achieved by removing the stator and associated contacts from the tool housing.

4 Claims, 3 Drawing Figures

ELECTRICAL CONTACT ARRANGEMENT FOR DISENGAGEABLE PARTS OF AN ELECTRIC TOOL

This is a continuation-in-part of application Ser. No. 298,411, filed Oct. 17, 1972, now abandoned.

SUMMARY OF THE INVENTION

The present invention is directed to electric tools which can be used for drilling, chiseling and similar operations and, more particularly, it concerns such tools which include disengageable parts with electrical contacts for the disengageable parts.

Electrical tools are known in which a handle is detachably connected to the tool housing and electrical parts of the tool, such as switches, fuses, condensers, power supply connections and the like, are located in the handle. The electrical parts contained in the handle are connected electrically by wires with the stator located in the tool housing.

In such an electric tool, if a damaged handle requires replacement, considerable time is involved, since the handle must be opened before it is removed from the tool housing so that the wires which connect the electrical parts in the handle with the stator in the tool housing can be cut. The replacement of handles on electric tools occurs relatively frequently, because the handle is damaged when the electric tool is dropped or is shipped improperly. Furthermore, if a malfunction occurs in the electrical parts in the handle, it is desirable to replace the entire handle so that the repair can be effected with a minimum number of tools and by persons without any special skill in repairing such tools.

Futhermore, in certain electric tools, the stator can be removed from the tool housing after a housing cover has been removed, so that, in case of damage by excessive current, the stator can be replaced. However, when such a replacement is made, it is necessary, initially, to open the handle and cut the connection between the stator and the electrical parts contained in the handle. Because it is necessary to open the handle and disconnect the wires leading to the stator, the replacement of the stator is a relatively complicated and time-consuming operation.

Therefore, it is the primary object of the present invention, to provide an electric tool where both the handle and the stator located within the tool housing can be replaced in a simple manner. Further, another object of the invention is to effect such replacement with a minimum number of tools.

Accordingly, the present invention has the following combination of features: the electrical parts of the tool are contained both in the tool hosing and in the handle, the handle is detachably connected to the tool housing, and the tool housing and the handle each have electrical contacts which automatically engage each with one another when the handle is assembled on the tool housing and which automatically disengage when the handle is removed from the tool hosing.

In this arrangement, the handle can be separated from the tool housing in a simple manner, for example, by removing connecting screws or other connecting elements, and, as it is removed, automatic interruption of the electrical connection between the electrical parts located in the handle and in the tool housing or in the stator positioned in the tool housing takes place. Accordingly, the time-consuming operation of disconnecting wires can be avoided. Further, in the reverse step of assembling the handle on the tool housing, the electrical connection between the electrical parts in the handle and in the tool housing is automatically established.

Perferably, the contacts are located in the connection range between the handle and the tool housing, that is, at the location where the handle abuts and is connected to the tool housing. The contacts associated with the handle can be arranged on the handle itself, while the other contacts associated with the handle can be arranged on the handle itself, while the other contacts can be arranged either directly on the stator or on the tool housing, since a connection between the stator winding and the tool housing is required if the opposite contacts are arranged on the tool housing.

This arrangement of the contacts permits easy replacement of parts which is of particular advantage in performing the repairs mentioned above.

Furthermore, the arrangement embodying the present invention, permits the maintenance of an inventory according to the mechanical assembly technique involved. Such an inventory is particularly advisable if the electrical tools are shipped to different countries where the safety and interference elimination specifications are different and also where there are differences in the power supply voltages. The differences in the various countries to which the tools are shipped make it necessary to use different electrical parts, such as condensers, switches and the like as well as stators corresponding to the particular power supply voltage used. Due to the simple replaceability of the handle and stator afforded by the present invention, it is possible to keep in stock for the various countries only different handles with the electrical parts according to the specifications of the countries as well as stators adapted to the power supply voltages of the countries. Accordingly, the electrical tools can be designed identically for any country, with the exception of the above-mentioned replaceable units, which has the advantage that the number of identical tool parts to be produced can be a considerable number, with the tools being provided in the final stage, that is immediately prior to shipping, with a handle which contains the electrical parts required in accordance with the specifications of a particular country, as well as with a stator also corresponding to the particular requirements.

Perferably, the contacts on the detachably connected handle are plug-contacts which can have the form of banana plugs, spring-loaded jaws, and the like.

If the contacts are arranged as knife-blade contacts, with one contact having the form of a loop-shaped or stirrupshaped contact element and the other the form of a plate or knife blade-shaped contact element in slidable engagement with the stirrup-shaped contact element, there is the advantage that certain longitudinal differences existing perpendicularly of the plugging direction can be compensated.

In addition, the assembly of the contacts is facilitated if guide elements are arranged on the handle or the tool housing. Such guide elements effect a positive engagement and insure that wrong contacts are not connected together in the case of an improper assembly. The guide elements can be provided in a simple manner in the form of projections extending from the handle which engage into recesses on the tool housing, or the reverse arrangement can be used with the projections on the tool housing and the recesses formed in the handle.

To facilitate their engagement, the contacts can be mounted on a holder formed preferably of insulating material and the holder including the contacts can be fitted as a unit into the tool housing or the handle. This type of mounting insures the perfect engagement between corresponding contacts.

As mentioned above, it is advantageous, in view of the inventory required, if the stator is mounted detachably as a unit in the tool housing and if the contacts are arranged so that the electrical connection is automatically broken when the stator is removed, and, similarly, the electrical connection is automatically effected when the stator is reinserted. If the contacts between the stator and the handle are designed as knife-blade contacts as mentioned above, it is possible, due to the position of these contacts transverse to the plugging direction, to remove the stator from the tool housing even with the handle inserted and to reinsert the stator, and during such removal and reinsertion the contacts automatically effect interruption and restoration of the electrical connection. In such an arrangement it is also possible to replace the handle with the stator inserted, and when the handle is removed the contacts automatically interrupt the electrical connection and effect it again when the handle is inserted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
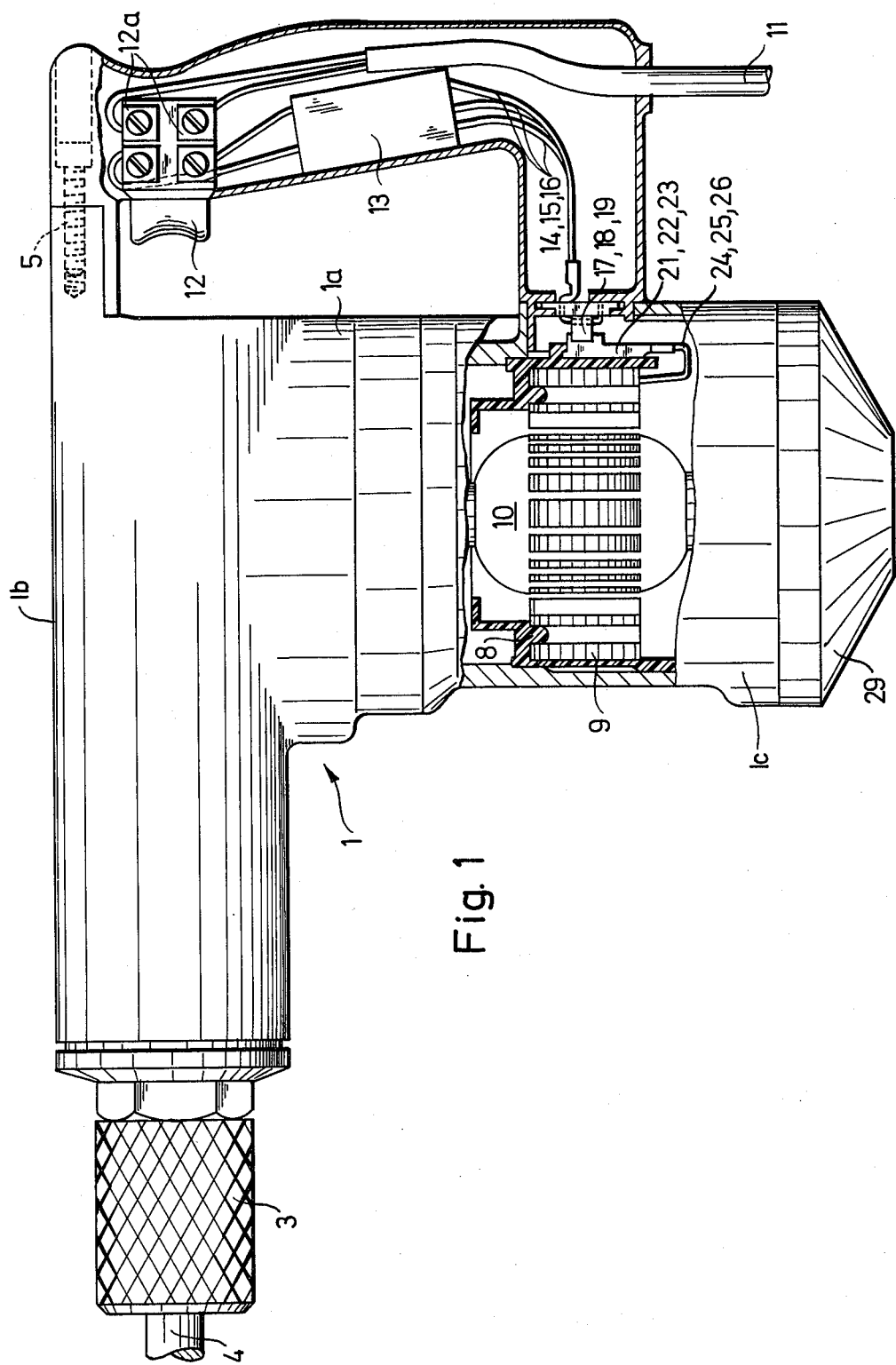
FIG. 1 is a side view, partly in section, of an electric tool embodying the present invention.
Figure 3:
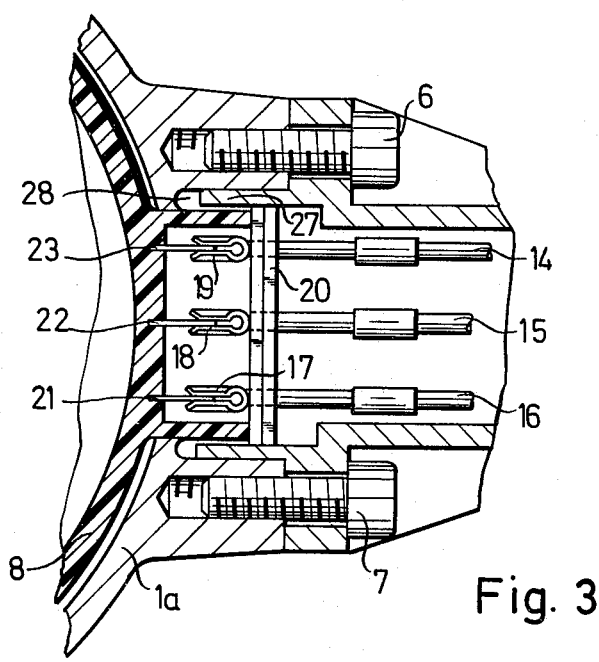
FIG. 3 is a sectional view taken along line III-III in FIG. 2.

In FIG. 1, an electric tool 1 is shown which includes a tool housing 1, 1a and a detachable handle 2 formed in a known manner of two substantially symmetrical halves connected together. At the opposite end of the tool housing 1a from the handle, a holder 3 is provided in which a tool 4, such as a drill, a chisel or the like, can be inserted. As illustrated in FIGS. 1 and 3, the handle is detachably connected to the tool housing by means of screws 5, 6 and 7. The screw 5 attaches the upper portion of the handle to the rear end of tool housing 1a while screws 6 and 7 secure the lower portion of the handle, note FIG. 3, to the tool housing. The tool 1 is operated by first electrical parts located in the tool housing 1a and second electrical parts located in the handle 2. In the tool housing 1a there is also a known gear arrangement which is not shown, and the first electrical parts include an electromotor of a known type, which comprises a stator 9 having an insulated casing 8 and a rotor 10 which are illustrated in FIG. 1. The tool housing 1a has a first part 1b to one end of which the holder 3 is connected and a second part 1c containing the stator 9 and rotor 10. The first part 1b extends in the axial direction of the holder and the second part 1c extends transversely from the first part at the opposite end from the holder 3.

Furthermore, in FIG. 1, the second electrical parts include a power supply line 11 connected to the handle and a pressure switch or trigger 12 and a condenser 13 mounted in the handle. For fixing the wiring in the handle, the pressure switch 12 has known contact screws 12a.

Figure 2:
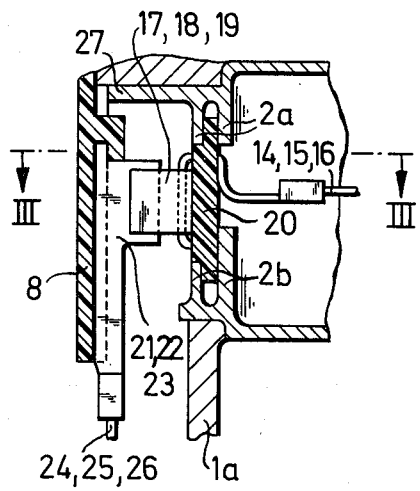
FIG. 2 is an enlarged sectional view of a portion of FIG. 1.

Other second electrical parts can also be arranged in the handle depending on the specifications of the country to which the electrical tool is to be shipped. The important feature of the invention is that the electrical lines from the handle are connected to lines in the tool housing 1a through contacts which automatically establish the electrical connection of all of the electrical parts of the device when the handle is assembled onto the tool housing. In FIGS. 1, 2 and 3, lines 14, 15 and 16 extend from the condenser 13 and are connected to bow or stirrupshaped contact elements 17, 18 and 19 and the bow or stirrupshaped contact elements are secured on a holder 20 formed, for example, of an insulating material. For securing the holder 20 in position, the handle has spaced bars 2a, 2b between which the holder is inserted when the handle is in its open state.

Within the tool housing 1a, the contacts opposite the stirrup-shaped contact elements 17, 18 and 19 are plate or knife blade shaped contacts 21, 22 and 23 which are secured on the casing 8 of the stator 9. The knife bladeshaped contacts 21, 22 and 23 are connected by means of the lines 24, 25 and 26 with the winding of the stator 9.

To insure a positive interlocking of the corresponding contacts when the handle is secured to the tool housing 1a, outwardly extending projections are provided on the handle and serve as guide elements for directing the handle into corresponding recesses in the second part 1c of the tool housing 1a. This guiding arrangement assures that the contacts cannot be damaged in the event an improper assembly of the handle on the tool housing is attempted.

The knife-blade shaped or V-type contacts used in the present invention have the advantage over plug contacts, for example, banana contacts, that after the housing cover 29 on the lower end of the second housing part 1c is removed, the stator forming a unit with its casing can be removed from the tool housing, even with the handle 2 attached to it in a direction parallel to the axis of the rotor. As viewed in FIGS. 1 and 2, as the stator is moved downwardly out of the lower end of the second housing part 1c its blade-shaped contact elements 21, 22 and 23, which have their side surfaces extending in planes parallel with the direction of insertion and removal of the stator, slide between the holding surfaces of the stirrup-shaped contact elements 17, 18 and 19 and electrical contact is broken when the contact surfaces separate. In this arrangement the blade-shaped contacts are removed in a direction extending substantially perpendicular to the plug-in direction in which the stirrupshaped contacts of the handle 2 are inserted into sliding contact engagement with the blade-shaped contact elements in the second housing part 1c. It is this feature of the slidable interconnection of the contacts which provides particular distinction between the device described herein and similar tools of a conventional type.

While a specific embodiment of the invention has been shown and described in detail to illustrate the application of the inventive principles, it will be understood that the invention may be embodied otherwise without departing from such principles.

What is claimed is:

1. An electric tool for use in a drilling or chiselling operation including a tool housing, a handle detachably connected to said tool housing, said tool housing comprising a first housing part having a tool holder at one end arranged to receive the tool and extending in the axial direction of said tool holder, and a second housing part connected to said first housing part at its end opposite said holder and extending transversely of and laterally outwardly from said first housing part, said handle extending transversely of the axial direction of said tool holder and connected to the opposite end of said first housing part from said tool holder and to said second housing part, electrical means for operating the electric tool comprising first electrical parts located in said second housing part and second electrical parts located in said handle and said first electrical parts and second electrical parts being connectible for operating the electric tool, wherein the improvement comprises that said first electrical parts and second electrical parts each comprises contact elements arranged to interfit with one another with said contacts comprising knife blade-shaped contacts secured to one of said first and second electrical parts and stirrup-shaped contacts secured to the other one of said first and second electrical parts, said knifeblade shaped contacts and said stirrup-shaped contacts are displaceably interengageable to provide electrical contact between said first electrical parts and said second electrical parts, displaceable means for mechanically interconnecting said tool housing and said handle so that said handle can be removed with said second electrical parts and said contacts secured thereto as a unit from said tool housing, at least one first guide element provided on said second housing part laterally adjacent said contacts therein and at least one second guide element provided on said handle laterally adjacent said contacts therein and said first and second guide elements being arranged to interengage when said tool housing and handle are assembled together for guiding said knife-blade shaped and stirrup-shaped contacts into interengagement and said contacts being arranged to disengage from one another automatically when said handle is removed from said tool housing, said second housing part including a removable cover, said first electrical parts within said second housing part comprising a stator including a casing with said stator and casing removably mounted as a unit in said second housing part, said contacts secured within said second housing part being connected to said casing of said stator, said stator said casing and said contacts connected thereto being removable from said second housing part as a unit in a direction transversely of the plugging direction of said handle into said second housing part, and said knife-blade shaped contacts arranged with the knife edges thereof located in planes extending substantially parallel to the direction of the removal of said stator said casing and said contacts from said second housing part and parallel to the plugging direction of said handle in said second housing part so that upon removal of said stator casing said contacts on said stator casing are automatically disconnected from said contacts secured within said handle.

2. An electric tool, as set forth in claim 1, wherein said knife-blade shaped contacts are located in said tool housing and said stirrup-shaped contact elements are located within said handle.

3. An electric tool, as set forth in claim 1, wherein said first guide element is a recess and said second guide element is a projection arranged to fit into said recess.

4. An electric tool, as set forth in claim 1, wherein a holder is arranged for supporting at least one of said knifeblade shaped contacts and stirrup-shaped contacts, said holder being secured in the one of said second housing parts and handle in which the one of said contacts which are supported on said holder are located.

* * * * *